(12) United States Patent
Gottin et al.

(10) Patent No.: US 10,901,782 B2
(45) Date of Patent: Jan. 26, 2021

(54) DATAFLOW EXECUTION TIME ESTIMATION FOR IN-MEMORY DISTRIBUTED PROCESSING FRAMEWORK

(71) Applicant: EMC IP Holding Company LLC, Hopkinton, MA (US)

(72) Inventors: Vinícius Michel Gottin, Rio de Janeiro (BR); Jonas F. Dias, Rio de Janeiro (BR); Edward José Pacheco Condori, Rio de Janeiro (BR); Angelo E. M. Ciarlini, Rio de Janeiro (BR); Bruno Carlos da Cunha Costa, Teresópolis (BR); Fábio André Machado Porto, Petrópolis (BR); Paulo de Figueiredo Pires, Rio de Janeiro (BR); Yania Molina Souto, Petrópolis (BR); Wagner dos Santos Vieira, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 242 days.

(21) Appl. No.: 16/040,774

(22) Filed: Jul. 20, 2018

(65) Prior Publication Data
US 2020/0026550 A1    Jan. 23, 2020

(51) Int. Cl.
*G06F 9/48* (2006.01)
*G06F 9/50* (2006.01)

(52) U.S. Cl.
CPC .......... *G06F 9/4881* (2013.01); *G06F 9/485* (2013.01); *G06F 9/5083* (2013.01)

(58) Field of Classification Search
CPC ...... G06F 9/485; G06F 9/4881; G06F 9/4887; G06F 9/5083
See application file for complete search history.

(56) References Cited

U.S. PATENT DOCUMENTS

| | | | |
|---|---|---|---|
| 8,997,073 B2* | 3/2015 | Ravi | G06F 8/452 717/151 |
| 2006/0288346 A1* | 12/2006 | Santos | G06F 9/5038 718/102 |

(Continued)

OTHER PUBLICATIONS

V. Sarkar. Determining Average Program Execution Times and their Variance. In Proceedings of the Conference on Programming Language Design and Implementation, pp. 298-312, 1989 (Year: 1989).*

(Continued)

*Primary Examiner* — Jacob D Dascomb
(74) *Attorney, Agent, or Firm* — Ryan, Mason & Lewis, LLP

(57) ABSTRACT

Techniques are provided for dataflow execution time estimation for distributed processing frameworks. An exemplary method comprises: obtaining an input dataset for a dataflow for execution; determining a substantially minimal data unit for a given operation of the dataflow processed by the given operation; estimating a number of rounds required to execute a number of data units in the input dataset using nodes assigned to execute the given operation; determining an execution time spent by the given operation to process one data unit; estimating the execution time for the given operation based on the execution time spent by the given operation to process one data unit and the number of rounds required to execute the number of data units in the input dataset; and executing the given operation with the input dataset. A persistent cost model is optionally employed to record the execution times of known dataflow operations.

20 Claims, 9 Drawing Sheets

(56) References Cited

U.S. PATENT DOCUMENTS

2014/0189416 A1* 7/2014 Tajima ................. G06F 9/4887
　　　　　　　　　　　　　　　　　　　　　　　　　713/600
2018/0321980 A1* 11/2018 Lo ........................ G06F 9/5038

OTHER PUBLICATIONS

Armbrust et al., "Spark SQL: Relational Data Processing in Spark", Proceedings of the 2015 ACM SIGMOD International Conference on Management of Data—SIGMOD '15 (New York, New York, USA, 2015), 1383-1394.

Dean et al., "MapReduce: A Flexible Data Processing Tool. Commun", ACM. 53, 1, 72-77. DOI:https://doi.org/10.1145/1629175.1629198 (2010).

Porto et al. "Constellation Queries over Big Data", CoRR. abs/1703.0, (2017).

"RDD Programming Guide: 2018", downloaded from https://spark.apache.org/docs/latest/rdd-programming-guide.html#resilient-distributed-datasets-rdds. Accessed: Jun. 19, 2018.

"Spark", downloaded from http://spark.apache.org/. Accessed: Jun. 19, 2018.

Zaharia et al. "Resilient distributed datasets: a fault-tolerant abstraction for in-memory cluster computing", Proceedings of the 9th USENIX conference on Networked Systems Design and Implementation. USENIX Association, 2012.

U.S. Appl. No. 15/662,704 entitled, "Automatic Placement of Cache Operations for Complex In-Memory Dataflows," filed Jul. 28, 2017.

* cited by examiner

1. CHECK CATALOG FOR AN ENTRY *MATCHING* $(o, i, \lambda)$:
   a. IF PRESENT, RETURN CORRESPONDING DATA UNIT;
2. LET THE *CURRENT INPUT SUBSET* $i_s$ BE INPUT DATASET, $i_s \leftarrow i$;
3. CHECK $i_s$ FOR RELEVANT METADATA;
   a. IF PRESENT, PARTITION $i_s$ ACCORDING TO METADATA INDICATION;
   b. IF NOT, PARTITION $i_s$ BASED ON ITS REPRESENTATION IN MEMORY;
4. LET $i_p$ BE SMALLEST PARTITION OBTAINED FROM STEP 3.
5. TEST WHETHER OPERATION $o$ CAN BE PERFORMED CORRECTLY OVER $i_p$ IN $\lambda$;
   a. IF NOT, ADD METADATA TO $i_s$ INDICATING IT CANNOT BE AS SMALL AS $i_p$ AND GO TO STEP 3.
   b. IF YES, COMPARE $i_s$ AND $i_p$:
      i. IF DIFFERENT, $i_s \leftarrow i_p$ AND GO TO STEP 3.
      ii. IF EQUAL, ADD ENTRY TO THE CATALOG $(o, i, \lambda): i_s$ AND RETURN $i_s$ AS DATA UNIT.

FIG. 2 i. INSTRUMENT CODE OF OPERATION WITH INSTRUCTION TO CAPTURE RELEVANT START TIME AND END TIME.

ii. RUN INSTRUMENTED OPERATION TO CAPTURE AND STORE EXECUTION TIME (DIFFERENCE OF END TIME AND START TIME GIVES THE EXECUTION TIME OF OPERATION).

iii. RANK EXECUTION TIMES FOR EACH COMPUTATIONAL NODE.

iv. SELECT HIGHEST EXECUTION TIME AMONG THE SAMPLES AS THE EXECUTION TIME PER DATA UNIT FOR AN EXEMPLARY WORST-CASE ANALYSIS.

v. MULTIPLY SELECTED EXECUTION TIME BY REQUIRED NUMBER OF ROUNDS TO OBTAIN ESTIMATED EXECUTION TIME OF OPERATION WITH COMPLETE DATASET.

FIG. 4

1. LET "CURRENT EVALUATION" $o$ BE NEXT UNEVALUATED OPERATION IN $D$.
2. SUBSET RELEVANT DATA IN $i$. SET $i \leftarrow$ A SUBSET OF THE PREVIOUS VALUE OF $i$, SUCH THAT IT IS POSSIBLE TO EXTRACT FROM THE NEW $i$ THE INPUT DATA UNIT $i_x$ FOR EACH CORRESPONDING OPERATION $o_x$ IN $D$ THAT WAS NOT YET EVALUATED.
3. IDENTIFY RELEVANT DATA UNIT $i_u$ FOR OPERATION $o$ IN INFRASTRUCTURE $\lambda$ FROM PREVIOUS INPUT $i$, THAT IS: $i_u \leftarrow \Delta(o, i, \lambda)$;
4. CHECK IF AN ENTRY $(o, i_u, \lambda)$ EXISTS IN COST MODEL;
   a. IF YES, SET $t \leftarrow M(o, i_u, \lambda)$ AS ESTIMATED EXECUTION TIME.
   b. IF NO:
      i. ESTIMATE NUMBER OF EXECUTION ROUNDS;
      ii. ESTIMATE $t \leftarrow Execution_{time}(o, i_u, \lambda)$, THE EXECUTION TIME PER DATA UNIT;
      iii. ADD AN ENTRY TO $M$ INDEXED BY $(o, i, \lambda)$ WITH THAT $t$ AS VALUE.
5. PERFORM ACTUAL EXECUTION OF OPERATION $o$ WITH INPUT DATASET $i$ OVER INFRASTRUCTURE $\lambda$ AND CAPTURE ACTUAL EXECUTION TIME $r$.
6. COMPARE ACTUAL EXECUTION TIME, $r$, WITH ESTIMATED EXECUTION TIME, $t$. IF DIFFERENCE IS ABOVE A SIGNIFICANT THRESHOLD, ENTRY $M(o, i_u, \lambda)$ IS AMENDED TO REFLECT THAT ERROR IN ESTIMATION.
7. IF THERE ARE UNEVALUATED OPERATIONS IN $D$, GO BACK TO STEP 1.

FIG. 7

DATAFLOW EXECUTION TIME ESTIMATION FOR IN-MEMORY DISTRIBUTED PROCESSING FRAMEWORK

FIELD

The field relates generally to the processing of dataflows in information processing systems.

BACKGROUND

The demands for large-scale data analysis and processing have led to the development and adoption of computing frameworks that leverage in-memory data processing. In-memory processing systems largely outperform disk-based processing systems. Many computational approaches and methods rely on estimations of processing times to execute processing tasks.

A need exists for improved techniques for estimating the execution time of dataflows (including single operations within dataflows) executed using distributed parallel processing frameworks, such as an in-memory distributed processing framework.

SUMMARY

Illustrative embodiments of the present disclosure provide for dataflow execution time estimation for distributed processing frameworks, such as in-memory distributed processing frameworks. In one embodiment, an exemplary method comprises: obtaining an input dataset for a dataflow for execution in a distributed processing framework; determining a data unit for a given operation of the dataflow, wherein the data unit comprises a substantially minimal unit of data processed by the given operation of the dataflow; estimating a number of rounds required to execute a number of data units in the input dataset using one or more nodes of the distributed processing framework assigned to execute the given operation; determining an execution time spent by the given operation to process one data unit; estimating the execution time for the given operation based on the execution time spent by the given operation to process one data unit and the number of rounds required to execute the number of data units in the input dataset; and executing the given operation with the input dataset in the distributed processing framework.

In some embodiments, the execution time spent by the given operation to process one data unit is determined by instrumenting source code of the given operation to obtain the start and end times of the given operation; and executing the instrumented code to capture the execution time of the given operation.

In at least one embodiment, a persistent cost model is employed to record the execution times of known dataflow operations. The persistent cost model is optionally instantiated in a data structure indexed by the given operation, an input data structure, input data, and an infrastructure of the distributed processing framework; and the cost model indicates the total execution time of the given operation. The persistent cost model optionally provides an estimate for an execution of a newly submitted dataflow and is extended as new operations are executed.

In one or more embodiments, the execution time of the executing step is captured and compared with the estimated execution time from the estimating step. The execution time for the given operation is optionally updated in the cost model when the difference between the captured execution time and the estimated execution time from the estimating step exceeds a predefined threshold.

Other illustrative embodiments include, without limitation, apparatus, systems, methods and computer program products comprising processor-readable storage media.

BRIEF DESCRIPTION OF THE DRAWINGS

FIG. 2 illustrates exemplary pseudo code for a data unit identification process, according to one embodiment of the disclosure;

FIG. 4 illustrates exemplary pseudo code for an execution time per data unit process, according to one embodiment;

FIG. 7 illustrates exemplary pseudo code for an execution-concurrent cost model process, according to one embodiment of the disclosure;

DETAILED DESCRIPTION

Figure 1:
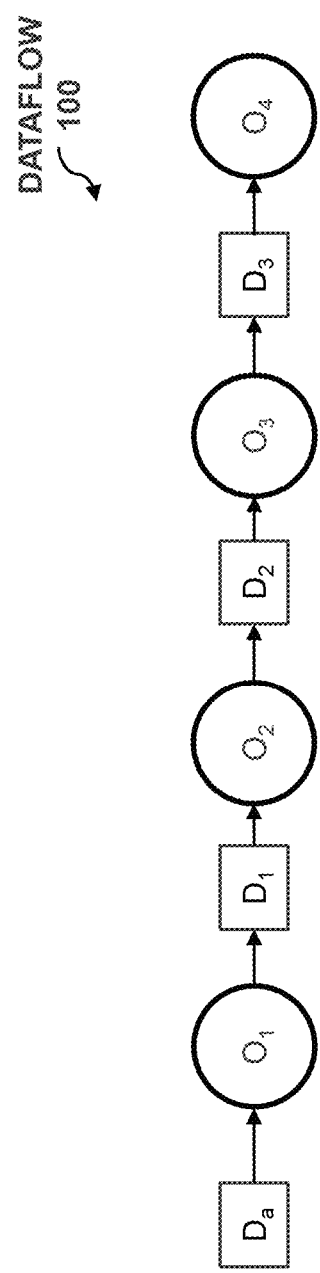
FIG. 1 illustrates an exemplary dataflow, that may be processed according to one embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for dataflow execution time estimation for distributed processing frameworks, such as in-memory distributed processing frameworks.

In one or more embodiments, a systematic process is provided to collect the execution time of dataflow operations in in-memory distributed processing frameworks, such as an Apache Spark in-memory distributed processing framework. A function is provided to estimate the execution time of dataflow operations in future executions. The execution time per data unit is captured in some embodiments, and the estimated number of rounds in the particular infrastructure is considered, to account for the parallel processing nature of dataflow execution engines and frameworks.

Some embodiments employ sample runs with the substantially smallest possible relevant data unit for the execution of each operation, and with only a single round of sample operations (e.g., of each operation over the smallest possible input data units) is executed. Thus, some embodiments of the disclosed dataflow operation execution time estimation process are efficient. The multiple execution nodes in the distributed processing framework can be employed to run many such samples in parallel, with no significant additional cost. Thus, multiple samples of this empirical observation are generated, contributing to the reliability of the method (particularly for a worst-case analysis of the execution time of each operation).

In one or more embodiments, the disclosed dataflow operation execution time estimation process enables the building of a cost model containing the execution time of known dataflow operations, instantiated, for example, in a structure M indexed, for example, by the operation, input data structure, input data, and infrastructure; yielding the total execution time. This cost model can be used to produce estimates for dataflow executions in newly submitted dataflows, and is extended as new (e.g., never before seen) operations are executed. In some embodiments, the extension is performed concurrently with the execution of the newly submitted dataflow (e.g., alternating but in the same order), to substantially ensure the consistency between operations and that any data dependencies are satisfied.

By considering possible generalizations in both the operation and input datasets, the possible reuse of previous experience is substantially maximized. The operations in the exemplary cost model M can be varied or may be estimated considering similar operations and input datasets.

Some embodiments provide a systematic approach for generating a coherent and reliable estimate of the execution time of dataflows and operations within those dataflows. An exemplary method employs estimates and empirical measurements collected across several executions of multiple dataflows. The exemplary method estimates the execution times of previously executed operations with different datasets, and also of similar operations to those previously executed.

In various embodiments, the disclosed techniques for estimating the execution time of dataflows and operations within those dataflows can be used for, for example, scheduling, orchestration and/or resource planning, in the domain of in-memory processing frameworks.

One or more aspects of the disclosure recognize that the structure and cardinality of an input dataset are typically correlated with the execution time of the dataflow operations that read the input dataset. Furthermore, the operations are executed in an infrastructure comprised of one or more computational nodes, each with a particular performance profile that affects the overall execution time. In addition, some operations can be frequently "re-used" in many dataflows. That is, they can be executed in a similar fashion, with varying input datasets, as parts of distinct workflows.

A cost model is provided in some embodiments for estimating the execution times of operations in distributed parallel frameworks (e.g., in the exemplary Spark framework) based on information from previous executions of those operations. A provenance database comprising the past execution times of dataflow operations can enable the estimation of further executions of such operations with different input datasets. Additionally, the provenance database optionally enables the estimation of execution times of similar operations and input datasets.

In parallel infrastructure environments with multiple computational nodes, the input dataset may be partitioned and distributed across the nodes. Thus, each operation of the dataflow processes distinct partitions of the dataset. This scenario makes the task of capturing the execution time of dataflow operations difficult because the size of the chunks can be different (referred to herein as data skew) and the performance of the computing nodes can also be different (referred to herein as task skew).

In at least one embodiment, the execution time is estimated given an estimate of data skew and/or task skew. That is, there is a need for collecting provenance data that is transparent regarding the concrete execution context, so that the execution time of a previously executed operation can be estimated even if it is executed in a different environment, with different data and task skew.

Dataflows are comprised of multiple operations, in which the output of one operation might serve as an input for subsequent operations. The process of capturing the execution time of a given operation individually must substantially guarantee that the dataflow context is coherent, that is, substantially guarantee that the dependency between operations (in relation to the produced and consumed datasets) holds.

Dataflow Execution Time Estimation

Consider the following concepts from in-memory processing frameworks and parallel computing:

Node—a computational node in a cluster environment.

Data Unit—a substantially minimal portion of the input data that is processed by an operation. For example, in a given map operation, where the input data is structured as a Spark Resilient Distributed Dataset (RDD), the data unit is the RDD line. In further variations, the data unit can be a row of an input table or a tuple, as would be apparent to a person of ordinary skill in the art.

Execution Round—the number of rounds required to compute the operation considering all data units. For example, in an infrastructure with eight nodes and 15 data units to be computed, dividing the data units by the nodes, and truncating the result to the superior limit, the number of rounds required to compute the operation is two.

FIG. 1 illustrates an exemplary dataflow 100, that may be processed according to one embodiment of the disclosure. As shown in FIG. 1, the exemplary dataflow 100 is represented as a directed acyclic graph (DAG), and comprises input data, $D_a$, an operation, $O_1$, such a transformation, that generates a dataset, $D_1$, that is then processed by an operation, $O_2$, that generates dataset, $D_2$. In addition, an operation, $O_3$, processes the dataset, $D_2$, and generates dataset, $D_3$, that is applied to an action operation, $O_4$.

For example, if the input dataset, $D_a$, comprises three tuples of data, the relevant data unit is a tuple, as discussed further below in a section entitled "Data Unit Identification."

Execution Time Estimation

One or more embodiments provide an estimator that infers the execution time of dataflow operations and a process to capture the input parameters for the estimator. The exemplary execution time estimator is given by the following equation:

$$\text{Execution}_{time}(o,i,\lambda)=\text{Execution}_{time}(o,i_u,\lambda)\times\text{RequiredRounds}(o,i,\lambda)$$

where o is an operation; i is the input data to the operation; $\lambda$ is a computational infrastructure; and $i_u$ is the estimated data unit in i. Generally, the estimated execution time of the operation o is a product of the execution time of this operation to compute the atomic data unit of i (i.e., $i_u$), and the number of rounds required to compute i in a given computational infrastructure $\lambda$.

An operation o is any computational process over a given input data, e.g., a map or a reduce operation. Such operations expect to receive the input data with a given structure, which can be, for example, tables, lists, or RDDs. Thus, depending on the kind of operation, a different data unit estimation takes place.

Data Unit Identification

As noted above, in the context of distributed environments, the exemplary execution time estimator needs to account for the number of rounds required for the complete execution of an operation. In one or more embodiments, an exemplary data unit identification function $\Delta(o,i,\lambda)$ that yields the data unit identification term $i_u$.

Based on the operation and the structure of the input data, the function $\Delta(o,i)$ returns the data unit of the input data that is computed by the operation. The exemplary data unit identification function $\Delta(o,i,\lambda)$ can be implemented, for example, as a look-up procedure in a catalog.

For known data structures and formats, known a-priori data unit types can be employed. Typical structures in Spark include, e.g., tabular structures and RDDs. The corresponding data units are a tuple and a line, respectively.

For unknown operations and data structures, the exemplary data unit identification function $\Delta(o,i,\lambda)$ can be implemented as a generate-and-test procedure, iteratively dividing a sample data subset $i_s$ of i until it is not divisible anymore, and therefore $i_s=i_u$. For example, if a contiguous array is the input, the data unit may configure a certain (smaller) contiguous memory size. Alternatively, in a text input dataset, the data unit may comprise a set of atoms or words, or even a set of character codes. In any event, the discovered data unit may be then annotated in a catalog for future use.

FIG. 2 illustrates exemplary pseudo code for a data unit identification process 200, according to one embodiment of the disclosure. Having an initialized catalog with known a-priori data units, and upon receiving a new operation o, input dataset i, and infrastructure $\lambda$, the exemplary data unit identification process 200 comprises the following steps:

1. Check the catalog for an entry matching $(o,i,\lambda)$:
   a. If present, return the corresponding data unit;
2. Let the current input subset $i_s$ be the input dataset, $i_s \leftarrow i$;
3. Check $i_s$ for relevant metadata;
   a. If present, partition $i_s$ according to the metadata indication;
   b. If not, partition $i_s$ based on its representation in memory (e.g., as contiguous bit array);
4. Let $i_p$ be the smallest partition obtained from step 3.
5. Test whether the operation o can be performed correctly over $i_p$ in $\lambda$;
   a. If not, add metadata to $i_s$ indicating it cannot be as small as $i_p$ and go to step 3.
   b. If yes, compare $i_s$ and $i_p$:
      i. If different, $i_s \leftarrow i_p$ and go to step 3.
      ii. If equal, add entry to the catalog $(o,i,\lambda)$: $i_s$ and return $i_s$ as data unit.

It is noted that pattern-matching and/or generalization algorithms can be used to generalize any of the arguments of the exemplary data unit identification process 200. For example, if a text file was previously submitted for operation o and the data unit was found to be a set of two words, then any future text file (regardless of actual content) can be inferred to also have a data unit of a set of two words in that infrastructure $\lambda$. Conversely, if a similar operation o' and/or a similar infrastructure $\lambda'$ are given as input, step 1 of the exemplary data unit identification process 200 should identify that entry as matching the entry in the catalog.

Required Rounds Estimation

As noted above, in the context of distributed environments, the exemplary execution time estimator needs to account for the number of required rounds (RequiredRounds $(o,i,\lambda)$) for the complete execution of an operation. Recall that the operations in a dataflow perform the computations over the set of data units of the input data.

The execution of the operation is performed on an infrastructure), composed of one or more nodes. When the infrastructure contains only one node, the number of rounds required to process all data units equals the total number of data units in the input data. For example, whether the operation performs over a tuple of a given table, and such table has one hundred tuples, the result of RequiredRounds $(\lambda, i)$ will be one hundred rounds.

On the other hand, when the infrastructure contains multiple nodes, the required rounds to compute the input data depends on the task allocation policy followed. For example, in an environment with seven nodes and 10 data units following a round robin allocation policy, two rounds are required since three of the nodes will execute two tasks each. The remaining four nodes execute a single task each and do not perform computation in the second round.

With knowledge of the task allocation policy, it is possible to know with substantial certainty the number of execution rounds. If the task allocation policy is unknown, the following can be used as an approximation:

$$RequiredRounds(\lambda, i) = \left\lceil \frac{\text{number of data units of } i}{\text{number of nodes of } \lambda} \right\rceil,$$

where $\lceil x \rceil$ is a ceiling function over x.

Figure 3:
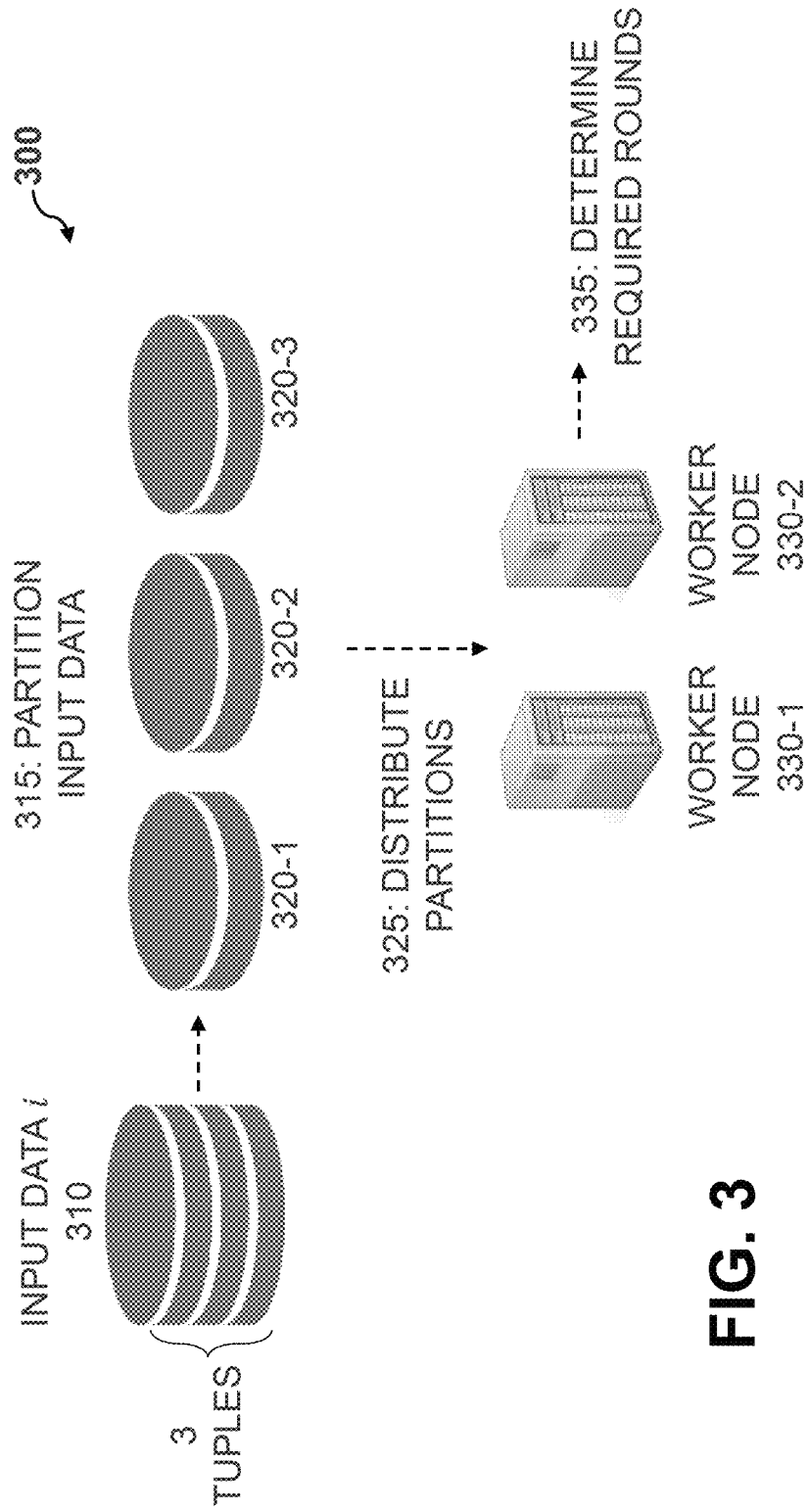
FIG. 3 illustrates an exemplary determination of a number of required rounds, according to some embodiments of the disclosure.

FIG. 3 illustrates an exemplary determination 300 of a number of required rounds, according to some embodiments of the disclosure. As shown in FIG. 3, an exemplary input dataset, i, 310 comprises three tuples. The input dataset 310 is partitioned during step 315 into three individual tuples 320-1 through 320-3.

The three individual tuples 320-1 through 320-3 are distributed across two worker nodes 330-1 and 330-2 of an infrastructure $\lambda$ during step 325. Finally, the required rounds are determined during step 335 using the above equation, as follows:

$$RequiredRounds(\lambda, i) = \left\lceil \frac{3 \text{ data units of } i}{2 \text{ nodes of } \lambda} \right\rceil.$$

In the example of FIG. 3, the input dataset 310 is partitioned across two worker nodes in the distributed infrastructure. The estimated required number of rounds are obtained for the execution of the operation over the complete dataset. When the exemplary input dataset 310 is partitioned across two worker nodes, the required number of rounds will be two, according to the above equation (three data units of i, divided by two worker nodes).

Capturing the Execution Time Per Data Unit

As noted above, the exemplary execution time estimator also needs to account for the execution time per data unit, corresponding to the term $\text{Execution}_{time}(o,i_u,\lambda)$ in the execution time estimation equation.

Given an operation, a data unit and infrastructure, the disclosed techniques estimate the execution time. Some embodiments generate empiric data to support that estimation.

An execution round (as previously defined) is orchestrated and the execution times of all sample executions are measured. Notice that since the data unit is the smallest set of data computable in the framework and the unit that configures a floor for data skew (e.g., a data unit cannot be further partitioned), this execution is substantially guaranteed to be the fastest possible execution for that context. The generation of samples is thus quick and efficient.

Furthermore, in an infrastructure with N execution nodes, a single round generates N samples (possibly of distinct data units). This increases the reliability of the estimation. Time estimation tasks are typically concerned with the worst case estimates for time as they help plan for bounds. Multiple samples are also highly desirable due to this requirement.

With the concrete time t that it takes to execute the operation over a data unit at hand, the estimated execution time for the operation is obtained over the substantially complete input data by multiplying t by RequiredRounds ($\lambda$, i).

FIG. 4 illustrates exemplary pseudo code for an execution time per data unit process 400, according to one embodiment of the disclosure. Generally, the exemplary execution time per data unit process 400 captures the amount of time spent by the dataflow operation to process a single data unit of i considering the operation o, as follows:

Given an operation o, an input data unit $i_u$ to be processed, and an infrastructure $\lambda$:

I. Instrument the code of the operation with instruction to capture the relevant start time and end time, as discussed further below in conjunction with FIG. 5. In some embodiments, the executable operation is modified, via introspection, injection over the executable file, or another computational method, in order to signal the actual start and end times of computation. These start and end times optionally disregard the time spent orchestrating the execution (e.g., overheads due to data distribution or network latency).

II. Run the instrumented operation to capture and store their execution time. The difference of end time and start time gives the execution time of the operation.

III. Rank the execution times for each computational node.

IV. Select the highest execution time among the samples as the execution time per data unit, for an exemplary worst-case analysis. In further variations, average execution times can be employed.

V. Multiply selected execution time by the required number of rounds to obtain the estimated execution time of the operation with the complete dataset.

Figure 5:
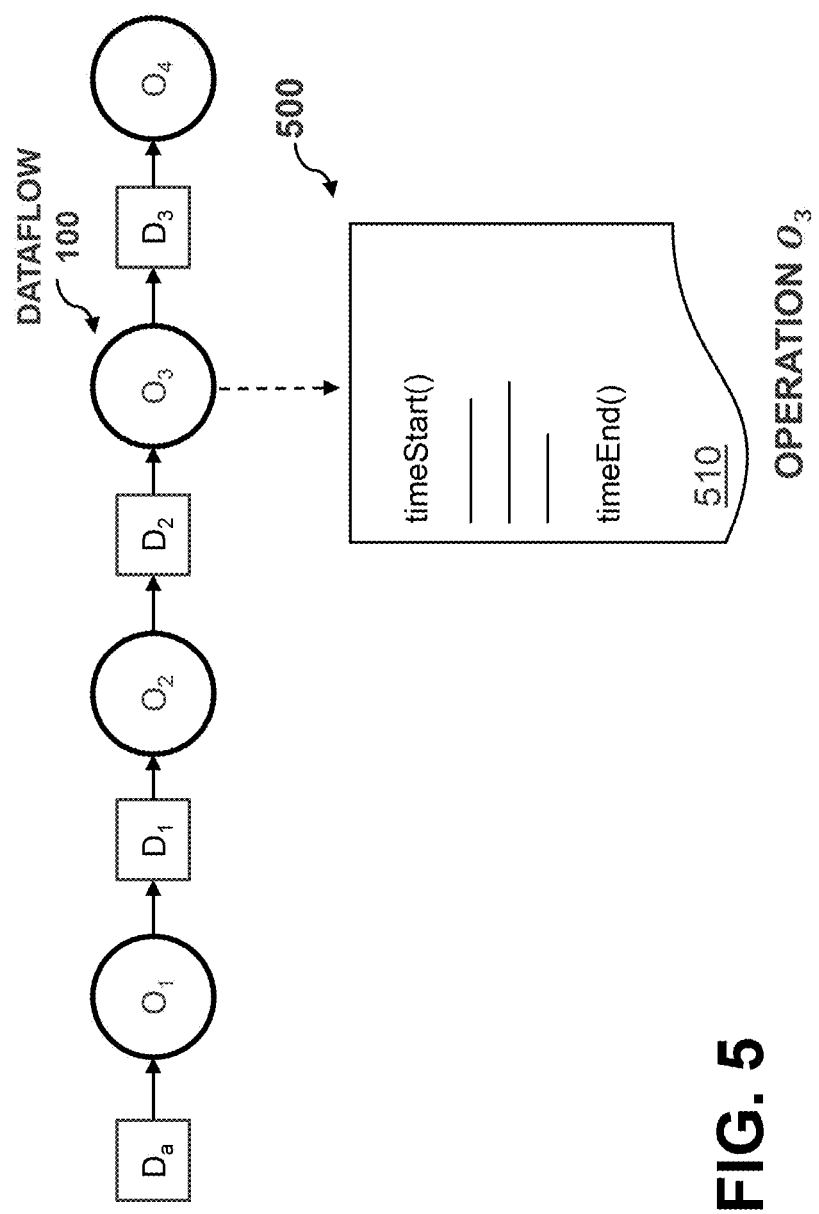
FIG. 5 illustrates an exemplary process for instrumenting an operation of the exemplary dataflow of FIG. 1, according to some embodiments.

FIG. 5 illustrates an exemplary process 500 for instrumenting an operation of the exemplary dataflow 100 of FIG. 1, according to some embodiments. As shown in FIG. 5, operation $O_3$ from dataflow 100 is instrumented by updating the code 510 of the operation $O_3$ with instructions to capture the relevant start time and end time. In this manner, the executable operation of $O_3$ is modified, via introspection, injection over the executable file, or another computational method, to signal the actual start and end times of the computation of operation $O_3$.

The execution time per data unit, corresponding to the Execution$_{time}$(o,$i_u$,$\lambda$) term in the execution time estimation equation, is obtained as follows:

Execution$_{time}$(o,$i_u$,$\lambda$)=timeStart( )−timeEnd( )=timeStamp.

Figure 6:
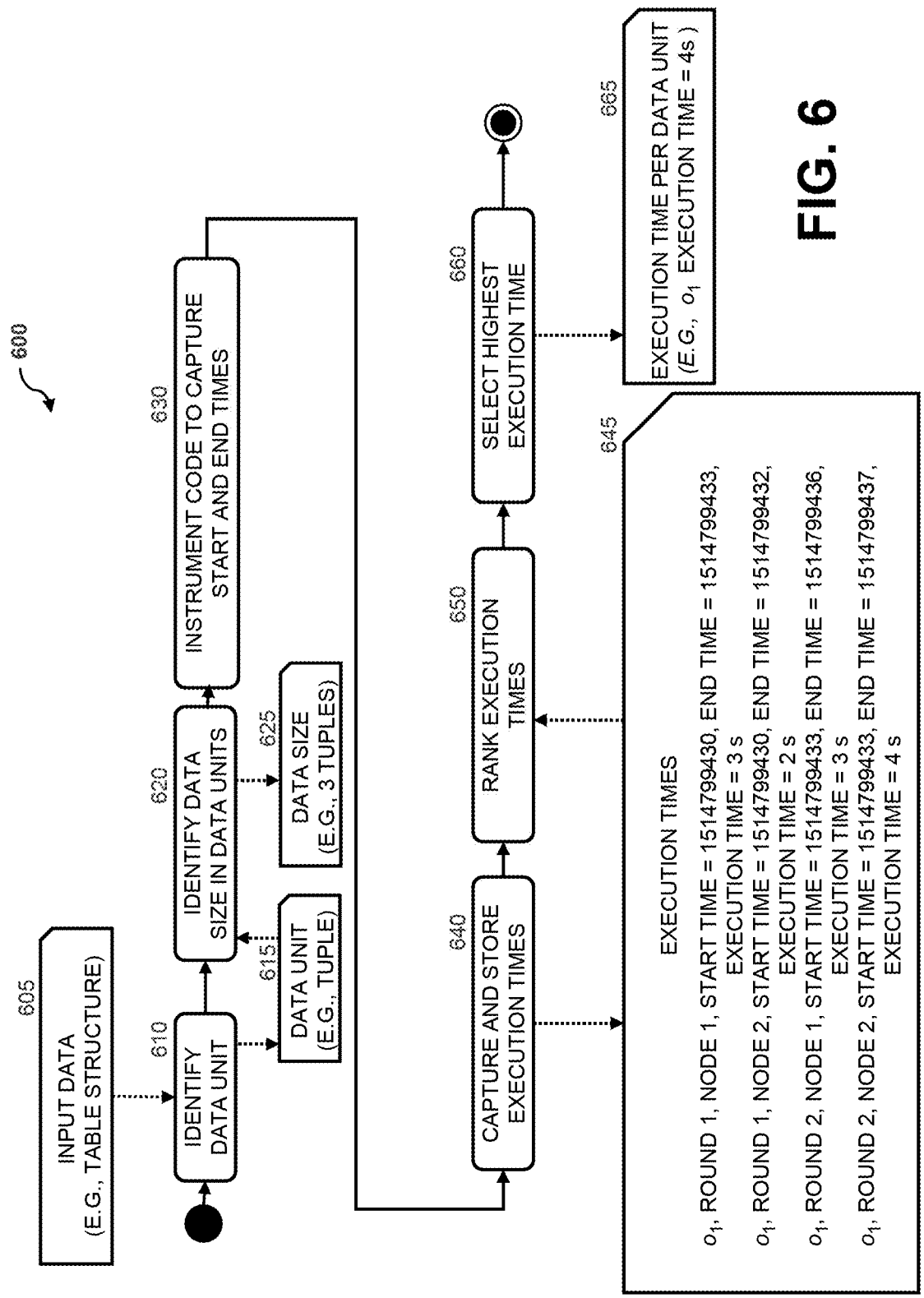
FIG. 6 is a flow chart illustrating an exemplary execution time capture process, according to an embodiment of the disclosure.

FIG. 6 is a flow chart illustrating an exemplary execution time capture process 600, according to an embodiment of the disclosure. Generally, the exemplary execution time capture process 600 captures the execution time of an operation. In the example of FIG. 6, a worst case execution time is obtained from the highest execution time observed in the empirical data unit executions (although average execution times, for example, can be employed in further variations of the disclosure).

As shown in FIG. 6, the exemplary execution time capture process 600 obtains the input data 605 (such as a table structure) and then identifies the data unit 615 (e.g., a tuple) for the input data 605 during step 610. Thereafter, the data size 625 in data units (e.g., 3 tuples in the example of FIG. 3) is identified during step 620.

The code is instrumented during step 630 to capture the start and end times of the code, as discussed above in conjunction with FIG. 5. The start and end execution times 645 of the code are then captured and stored during step 640, and then ranked during step 650. For example, as shown in FIG. 6 for round 1 and node 1 of an exemplary operation $o_1$, the captured start time is 1514799430, and the captured end time is 1514799433, yielding an execution time of 3 seconds.

The highest execution time is selected during step 660 as the execution time per data unit 665. As shown in FIG. 6, for the exemplary start and end execution times 645, the highest execution time for exemplary operation $o_1$ is 4 seconds.

Execution-Concurrent Cost Model

With the iterative application of the execution time estimation equation, over distinct operations, input datasets and infrastructures, a cost model is obtained for the execution of a dataflow D comprising operations $o_1, \ldots, o_n$, input dataset i, and infrastructure $\lambda$. A cost model is a function, expressed as follows:

$$M(o,i,\lambda) \rightarrow \mathbb{R}$$

that encapsulates previously collected execution times Execution$_{time}$(o,i,$\lambda$).

It is noted that in some embodiments the exemplary method described herein is optionally integrated with the execution of the dataflow itself in the parallel processing framework.

Let M configure a catalog structure (e.g., an indexed structure, indexed by (o,i,$\lambda$)). The cost of each $o_x$ for $1 \leq x \leq n$ is estimated, given a dataflow D submitted for execution with an original input dataset I in a parallel processing engine, typically an in-memory framework.

In the following discussion for one or more exemplary embodiments, a dataflow D is assumed to comprise a direct acyclic graph (DAG) where the nodes (vertices) are the operations, and the edges represent the data dependencies between them. Typically, the defined dataflow implicitly defines such a graph, and syntactical analysis of a program is sufficient to derive the graph.

This estimation can be considered a 'simplified execution' of the dataflow. In one or more embodiments, the operations are evaluated in the order that they would be executed in the actual dataflow execution, under substantially the same infrastructure, except the original dataset I is manipulated to comprise the relevant data unit at each step.

FIG. 7 illustrates exemplary pseudo code for an execution-concurrent cost model process 700, according to one embodiment of the disclosure. The exemplary execution-concurrent cost model process 700 starts with i←I, a copy of the input dataset to the dataflow, and can be described as follows:

1. Let "current evaluation" o be the next unevaluated operation in D.

2. Subset the relevant data in i. Set i← a subset of the previous value of i, such that it is possible to extract from the new i the input data unit $i_x$ for each corresponding operation $o_x$ in D that was not yet evaluated.

3. Identify the relevant data unit $i_u$ for operation o in infrastructure $\lambda$ from the previous input i, that is: $i_u \leftarrow \Delta$(o, i,$\lambda$) (as in section entitled "Data Unit Identification");

4. Check if an entry $(o,i_u,\lambda)$ exists in the cost model;
   a. If yes, set $t \leftarrow M(o,i_u,\lambda)$ as the estimate execution time.
   b. If no:
      i. Estimating the number of execution rounds (as in section entitled "Required Rounds Estimation");
      ii. Estimate $t \leftarrow \text{Execution}_{time}(o,i_u,\lambda)$, the execution time per data unit (as in section entitled "Capturing Execution Time Per Data Unit");
      iii. Add an entry to M indexed by $(o,i,\lambda)$ with that t as value.
5. Perform the actual execution of operation o with the input dataset i over infrastructure $\lambda$ and capture the actual execution time r.
6. Compare r, the actual execution time, with t, the estimated execution time. If the difference is above a significant threshold, the entry $M(o,i_u,\lambda)$ is amended to reflect that error in estimation.
7. If there are unevaluated operations in D, go back to step 1.

In step 1 of the exemplary execution-concurrent cost model process 700, this selection follows the logic of the processing framework. Generally, the selection ensures in some embodiments that the execution times (possibly) captured in sample runs over data units in step 4 are coherent with the context of the executions (relating to step 5, where the actual execution of the operation is performed with the proper, complete, dataset).

In step 2 of the exemplary execution-concurrent cost model process 700, heuristics are optionally applied to determine the optimal input dataset. For example, i can be considered to be unchanged. This step is included in the exemplary implementation in FIG. 7 as an optional point of optimization for the algorithm when enough metadata is available to make informed decisions.

Regarding step 4 of the exemplary execution-concurrent cost model process 700 (particularly, 4.b.iii) and step 5, notice that generalizations such as the one described in the section entitled "Data Unit Identification" apply. Since $i_u$ is a data unit extracted from i, it should present the same characteristics. Therefore, if $(o,i_u,\lambda)$ is in the cost model, then $(o,i,\lambda)$ is considered similar and therefore also in the cost model, referring to the same entry. The reverse is also true. That is, a generalization aspect is assumed in some embodiments that can take the part-for-the-whole but also the whole-for-the-part. As a simplifying aspect, new entries are included with the most general index (which is why an entry is added to index $(o,i,\lambda)$ and not $(o,i_u,\lambda)$ in step 4.b.iii). This generalization optionally ensures that if a similar operation is executed in the future in a different context, the past estimations already in the cost model can be re-used.

In at least one embodiment of the disclosure, when parallel executions of operations are possible, the parallelism is employed for evaluating the diverging branches beforehand to speed up the process. For example, assume that at a certain point in the execution of the method input datasets $i_a$ and $i_b$ are available for the execution of unevaluated operations $o_a$ an $o_b$ as possible current evaluations. Assume $o_a$ is chosen to be the current evaluation. Then, while the steps above are executed in order for $o=o_a$ and $i=i_a$, steps 3, 4 and 5 are concurrently executed with operation $o=o_b$ and $i=i_b$. Later, when operation $o_b$ is selected as current evaluation, these steps are skipped and only steps 1, 2, 5 and 6 are performed.

In some embodiments, the disclosed techniques for dataflow execution time estimation for in-memory distributed processing frameworks estimate execution times for dataflows.

Among other benefits, the disclosed dataflow operation execution time estimation process employs sample runs with the substantially smallest possible relevant data unit for the execution of each operation, and with only a single round of sample operations (e.g., of each operation over the smallest possible input data units) is executed.

One or more embodiments of the disclosure provide improved methods, apparatus and computer program products for dataflow execution time estimation for in-memory distributed processing frameworks. The foregoing applications and associated embodiments should be considered as illustrative only, and numerous other embodiments can be configured using the techniques disclosed herein, in a wide variety of different applications.

It should also be understood that the disclosed dataflow operation execution time estimation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for dataflow operation execution time estimation may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based disclosed dataflow operation execution time estimation engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based disclosed dataflow operation execution time estimation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. These platforms may also be used to implement at least portions of other information processing systems in other embodiments.

Figure 8:
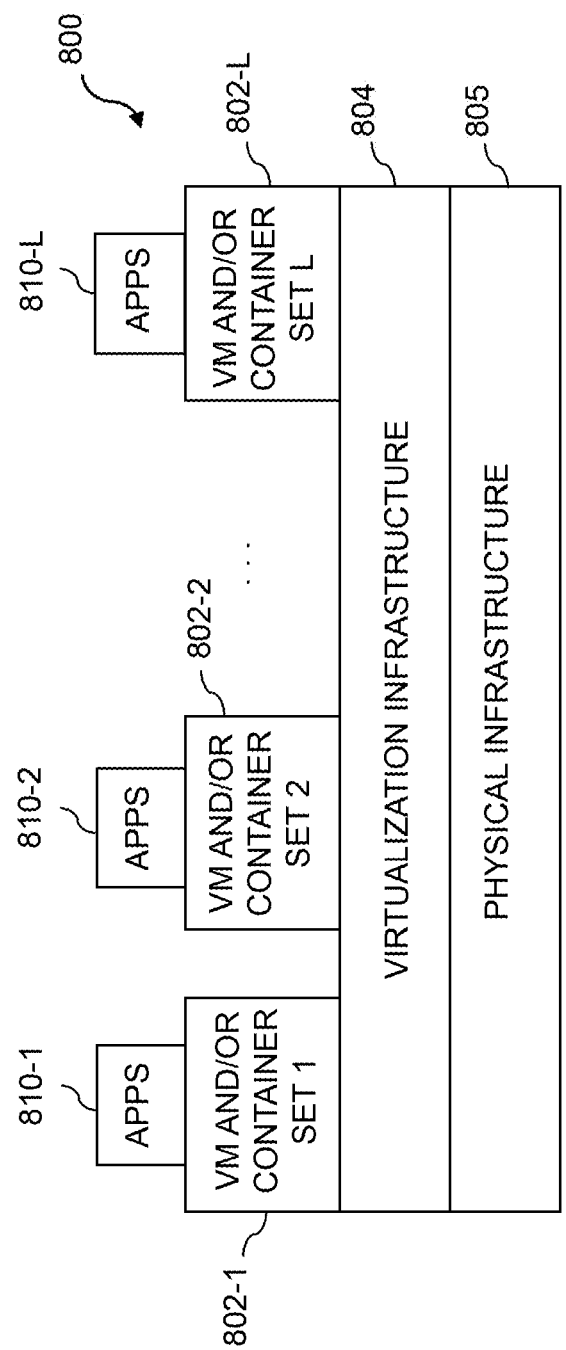
FIG. 8 illustrates an exemplary processing platform that may be used to implement at least a portion of one or more embodiments of the disclosure comprising a cloud infrastructure.

FIG. 8 shows an example processing platform comprising cloud infrastructure 800. The cloud infrastructure 800 comprises a combination of physical and virtual processing resources that may be utilized to implement at least a portion of the disclosed dataflow operation execution time estimation system. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. Such implementations can provide dataflow operation execution time estimation functionality of the type described above for one or more processes running on a given one of the VMs. For example, each of the VMs can implement dataflow operation execution time estimation control logic and associated dataflow operation execution time estimation functionality for one or more processes running on that particular VM.

An example of a hypervisor platform that may be used to implement a hypervisor within the virtualization infrastructure 804 is the VMware® vSphere® which may have an associated virtual infrastructure management system such as the VMware® vCenter™. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system. Such implementations can provide dataflow operation execution time estimation functionality of the type described above for one or more processes running on different ones of the containers. For example, a container host device supporting multiple containers of one or more container sets can implement one or more instances of dataflow operation execution time estimation control logic and associated cost model data structures for use in generating execution time estimates.

As is apparent from the above, one or more of the processing modules or other components of the disclosed dataflow operation execution time estimation system may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises at least a portion of the given system and includes a plurality of processing devices, denoted 902-1, 902-2, 902-3, . . . 902-K, which communicate with one another over a network 904. The network 904 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an application specific integrated circuit (ASIC), a field programmable gate array (FPGA) or other type of processing circuitry, as well as portions or combinations of such circuitry elements, and the memory 912, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Figure 9:
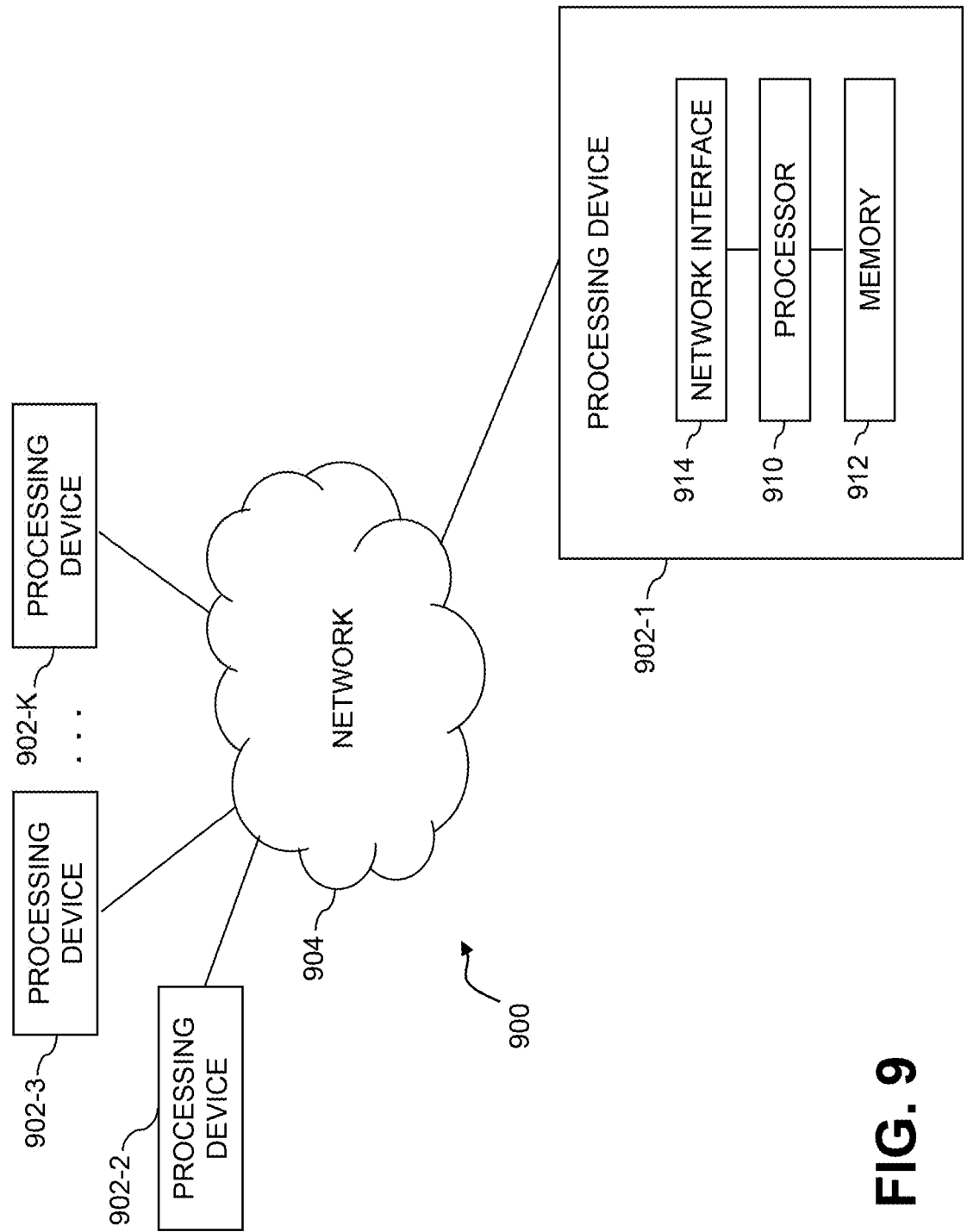
FIG. 9 illustrates another exemplary processing platform that may be used to implement at least a portion of one or more embodiments of the disclosure.

Multiple elements of system may be collectively implemented on a common processing platform of the type shown in FIG. 8 or 9, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising: obtaining an input dataset for a dataflow for execution in a distributed processing framework comprising a plurality of processing nodes;

determining a data unit for a given operation of the dataflow, wherein the data unit is based on a size of a partition of data processed by each of the processing nodes assigned to execute the given operation, wherein the partitioning of the input dataset is determined for the given operation of the dataflow;

estimating a number of rounds required to execute a number of data units in the input dataset using the processing nodes of the distributed processing framework assigned to execute the given operation, wherein the number of rounds is based on a relative number of the data units processed by each of the processing nodes assigned to execute the given operation;

determining, using at least one processing device, a round execution time for one or more of the processing nodes assigned to execute the given operation to process one data unit; and estimating, using the at least one processing device, an operation execution time for the given operation to process the input dataset based on the round execution time and the number of rounds required to execute the number of data units in the input dataset, wherein the given operation is executed with the input dataset in one or more of the distributed processing framework and a second distributed processing framework.

2. The method of claim 1, wherein the step of determining the round execution time further comprises the steps of instrumenting source code of the given operation to obtain the start and end times of the given operation; and executing the instrumented code to capture the round execution time of the given operation.

3. The method of claim 1, further comprising the step of generating a persistent cost model containing the operation execution times of known dataflow operations.

4. The method of claim 3, wherein the persistent cost model is instantiated in a data structure indexed by the given operation, an input data structure, input data, and an infrastructure of the distributed processing framework; and wherein the persistent cost model indicates the total execution time of the given operation.

5. The method of claim 3, wherein the persistent cost model provides an estimate for an execution of a newly submitted dataflow, and wherein the persistent cost model is extended as new operations are executed.

6. The method of claim 1, further comprising the step of capturing the execution time of the execution of the given operation and comparing the captured execution time with the estimated operation execution time from the estimating step.

7. The method of claim 6, further comprising the step of updating the operation execution time for the given operation in a cost model when the difference between the captured execution time and the estimated operation execution time from the estimating step exceeds a predefined threshold.

8. The method of claim 1, wherein the execution of the given operation comprises executing a single round of the given operation when the given operation comprises a sample operation.

9. A system, comprising:
a memory; and
at least one processing device, coupled to the memory, operative to implement the following steps:
obtaining an input dataset for a dataflow for execution in a distributed processing framework comprising a plurality of processing nodes;
determining a data unit for a given operation of the dataflow, wherein the data unit is based on a size of a partition of data processed by each of the processing nodes assigned to execute the given operation, wherein the partitioning of the input dataset is determined for the given operation of the dataflow;

estimating a number of rounds required to execute a number of data units in the input dataset using the processing nodes of the distributed processing framework assigned to execute the given operation, wherein the number of rounds is based on a relative number of the data units processed by each of the processing nodes assigned to execute the given operation;

determining, using at least one processing device a round execution time for one or more of the processing nodes assigned to execute the given operation to process one data unit; and estimating, using the at least one processing device, an operation execution time for the given operation to process the input dataset based on the round execution time and the number of rounds required to execute the number of data units in the input dataset, wherein the given operation is executed with the input dataset in one or more of the distributed processing framework and a second distributed processing framework.

10. The system of claim 9, wherein the step of determining the round execution time further comprises the steps of instrumenting source code of the given operation to obtain the start and end times of the given operation; and executing the instrumented code to capture the round execution time of the given operation.

11. The system of claim 9, further comprising the step of generating a persistent cost model containing the operation execution times of known dataflow operations.

12. The system of claim 11, wherein the persistent cost model provides an estimate for an execution of a newly submitted dataflow, and wherein the persistent cost model is extended as new operations are executed.

13. The system of claim 9, further comprising the step of capturing the execution time of the execution of the given operation and comparing the captured execution time with the estimated operation execution time from the estimating step.

14. The system of claim 9, wherein the execution of the given operation comprises executing a single round of the given operation when the given operation comprises a sample operation.

15. A computer program product, comprising a non-transitory machine-readable storage medium having encoded therein executable code of one or more software programs, wherein the one or more software programs when executed by at least one processing device perform the following steps:

obtaining an input dataset for a dataflow for execution in a distributed processing framework comprising a plurality of processing nodes;

determining a data unit for a given operation of the dataflow, wherein the data unit is based on a size of a partition of data processed by each of the processing nodes assigned to execute the given operation, wherein the partitioning of the input dataset is determined for the given operation of the dataflow;

estimating a number of rounds required to execute a number of data units in the input dataset using the processing nodes of the distributed processing framework assigned to execute the given operation, wherein the number of rounds is based on a relative number of the data units processed by each of the processing nodes assigned to execute the given operation;

determining, using at least one processing device, a round execution time for one or more of the processing nodes assigned to execute the given operation to process one data unit; and estimating, using the at least one processing device, an operation execution time for the given operation to process the input dataset based on the round execution time and the number of rounds required to execute the number of data units in the input dataset, wherein the given operation is executed with the input dataset in one or more of the distributed processing framework and a second distributed processing framework.

16. The computer program product of claim 15, wherein the step of determining the round execution time further comprises the steps of instrumenting source code of the given operation to obtain the start and end times of the given operation; and executing the instrumented code to capture the round execution time of the given operation.

17. The computer program product of claim 15, further comprising the step of generating a persistent cost model containing the operation execution times of known dataflow operations.

18. The computer program product of claim 17, wherein the persistent cost model provides an estimate for an execution of a newly submitted dataflow, and wherein the persistent cost model is extended as new operations are executed.

19. The computer program product of claim 15, further comprising the step of capturing the execution time of the execution of the given operation and comparing the captured execution time with the estimated operation execution time from the estimating step.

20. The computer program product of claim 15, wherein the execution of the given operation comprises executing a single round of the given operation when the given operation comprises a sample operation.

* * * * *